United States Patent [19]

Willerding

[11] Patent Number: 4,660,708
[45] Date of Patent: Apr. 28, 1987

[54] BOTTLE FEEDING MACHINERY

[75] Inventor: Jozsef Willerding, Driebergen, Netherlands

[73] Assignee: Stork Bepak B.V., Utrecht, Netherlands

[21] Appl. No.: 602,387

[22] Filed: Apr. 20, 1984

[30] Foreign Application Priority Data

Apr. 22, 1983 [NL] Netherlands ................. 8301427

[51] Int. Cl.4 .................. B65G 33/06; B65G 43/08; B65G 47/30
[52] U.S. Cl. ................. 198/341; 198/459; 198/467.1; 198/571
[58] Field of Search ........... 198/475, 625, 459, 460, 198/461, 462, 341, 467.1, 571

[56] References Cited

U.S. PATENT DOCUMENTS

| 2,768,656 | 10/1956 | Day et al. ................. | 198/459 |
| 2,829,757 | 4/1958 | Breeback .................. | 198/459 |
| 2,859,858 | 11/1958 | Stover ..................... | 198/459 |
| 3,314,519 | 4/1967 | Kelly ...................... | 198/459 |
| 3,565,235 | 2/1971 | Brown et al. ............... | 198/462 |
| 3,652,369 | 3/1972 | Della Vite ................. | 198/475 |
| 3,841,946 | 10/1974 | Carter ..................... | 198/459 |

FOREIGN PATENT DOCUMENTS

| 668188 | 8/1963 | Canada .................. | 198/459 |
| 2435567 | 2/1976 | Fed. Rep. of Germany ..... | 198/475 |
| 2919488 | 11/1980 | Fed. Rep. of Germany ..... | 198/459 |
| 978914 | 1/1965 | United Kingdom .......... | 198/459 |

Primary Examiner—Joseph E. Valenza
Assistant Examiner—Daniel R. Alexander
Attorney, Agent, or Firm—Lackenbach Siegel Marzullo & Aronson

[57] ABSTRACT

This invention concerns a connecting device for synchronously intercoupling machines mounted in series and handling a stream of objects 9 e.g. bottles which are uninterruptedly fed by a first machine 1 toward a second machine 4, the device essentially comprising a set of overlapping worms 6, 7 serving to arrange or classify the stream of objects, one of the worms 6, being positively retractable in a direction perpendicular to the direction of travel of the stream of objects, a guide rail 20 for the objects being provided at the location of the retractable worm 6.

5 Claims, 5 Drawing Figures

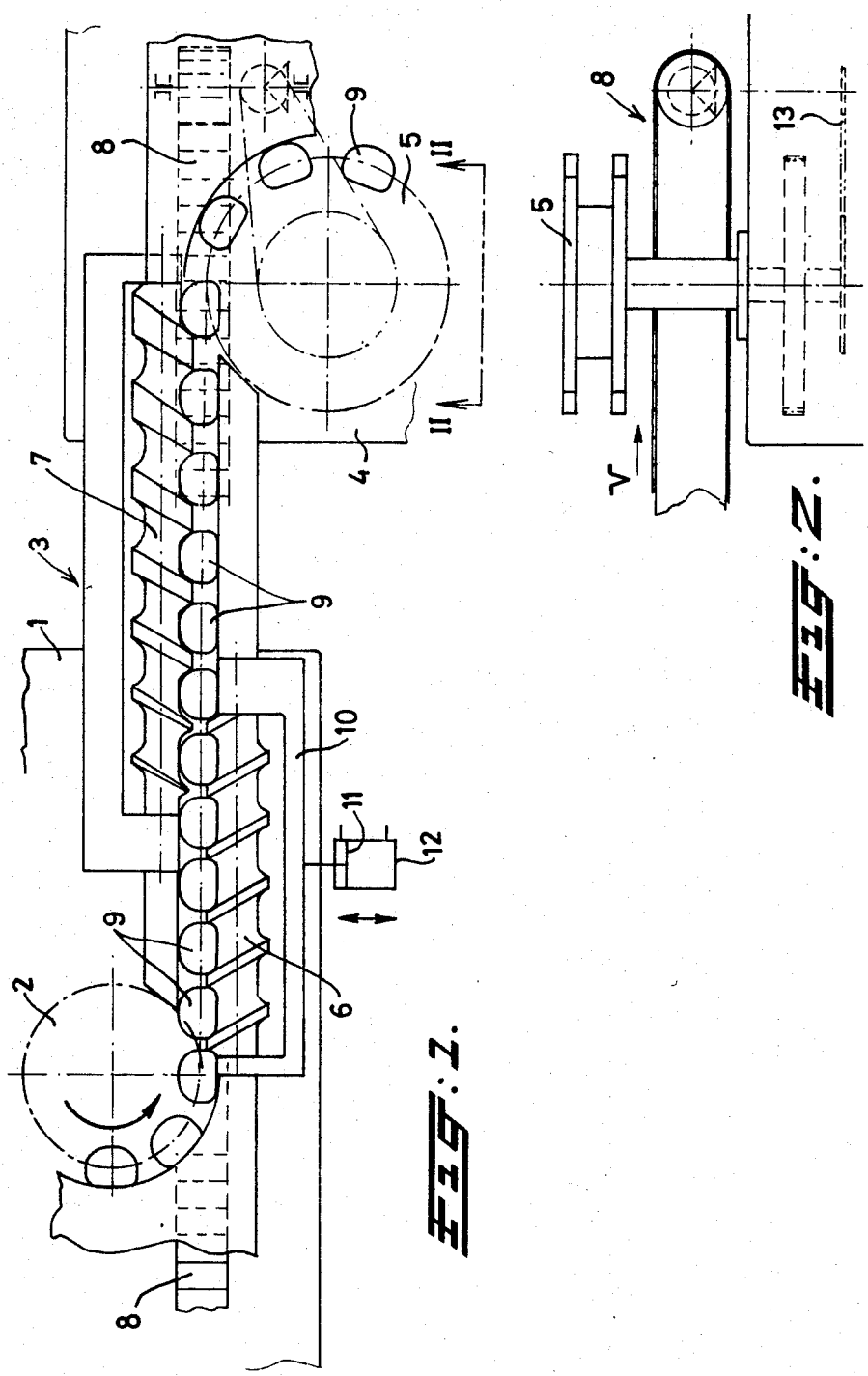

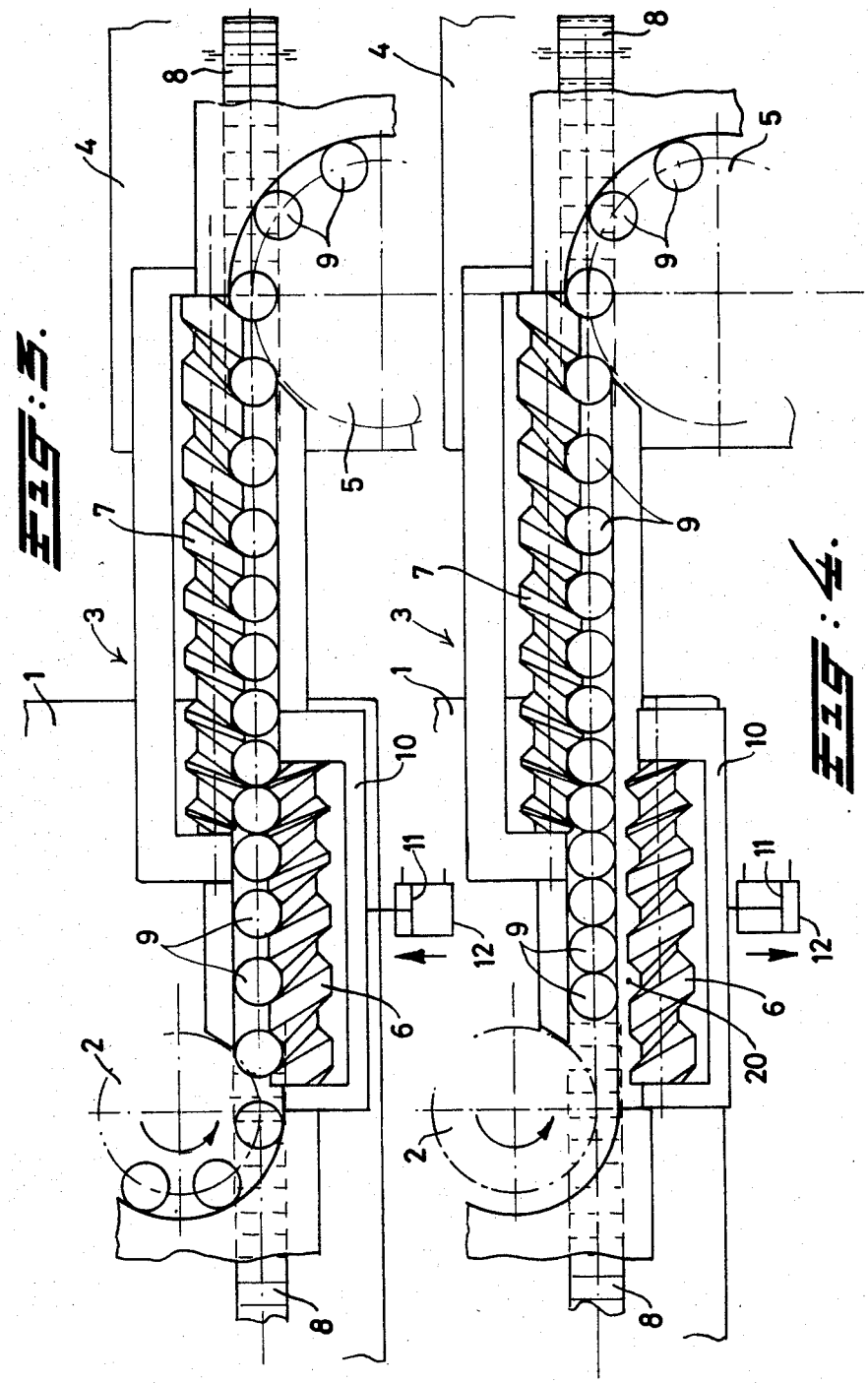

BOTTLE FEEDING MACHINERY

This invention relates to a device for connecting the outlet of a first handling machine, adapted for passing a series of objects being delivered therefrom, to the inlet of a second handling machine, capable of also handling a series of these same objects, said device comprising two parallel arranging or classifying worms which are disposed at some distance from one another and which partially overlap one another, one of which adjoins the said outlet and the other one of which adjoins the said inlet. The device further comprises a conveyor belt between the worms for supporting and advancing the objects, a disengageable synchronous coupling between the two machines and their classifying worms, and the second machine with the inlet coupled thereto is provided with a separate creep-speed drive.

BACKGROUND OF THE INVENTION

Such a device is while known as bottle-handling machine, for example composed of a filling machine and a labelling machine. In such case, the bottles are supplied to each of these machines in a lined-up fashion (a stream), and subsequently discharged in the same or a different lined-up fashion. The connection between the two successive machines consists of the aforementioned two parallel classifying worms which are disposed at some distance from one another and which also partially overlap one another. Such a connecting device is especially important when handling non-round objects (bottles or cans) which are not capable of being temporarily stored in a buffer supply and subsequently withdrawn therefrom.

When there occurs a disturbance somewhere, the installation must be stopped. If the installation comprises a labeling machine, it must be unloaded, however, because in the event of a long stoppage, the mass of glue applied for the labeling operation will dry and harden. In such case, it is known in practice to uncouple the labeling machine from the other machine and to manually remove the bottles present in the (helical) grooves of the first classifying worm. Thereupon, the labeling machine is engaged at a low or creep-speed by means of its own drive until the bottles in the path of travel from the overlap have all been removed. As soon as the disturbance has been eliminatedd, the installation is again operated at normal speed so as to resynchronize the machines. Thereupon, the bottles initially taken out of the first worm must be placed back immediately. This is not only a time consuming operation but also hampers the manual placing and removing of bottles, because it is necessary to first remove the safety protection means.

SUMMARY OF THE INVENTION

It is a primary object of the present invention to provide a connecting device which is constructed such that, in the event of a disturbance the installation can be stopped and disengaged, without the requirement of a manual intervention, while the second handling machine is emptied, and, after elimination of the disturbance, can be gradually restored into operation again.

Said object is attained according to the invention by means provided for displacing the first classifying worm transversely to its longitudinal direction and in the area of the first classifying worm, there is provided a guide rail along the conveyor belt for guiding the objects.

These measures afford all objects (bottles) to be carried off entirely by the conveyor belt and the second worm to the second handling machine, and ensure that the two worms, are completely empty when the installation is put into operation again. As a result thereof, the chance of the connecting device getting jammed is practically reduced to zero.

The advantage of automating the starting after emptying of a handling machine which can only be stopped briefly without inconvenient consequences, is that the decision to stop same, after the occurrence of a disturbance, can be taken at a later moment, than is the case presently with existing prior art machines. Thus, the invention avoids the need to empty a machine, particularly in thoses cases where afterwards the disturbance turns out to be of short duration. In other words: the invention offers more time for decisions which must be made in a plant about stopping and thus diminishes the occurrent reduction in efficiency when the machines are shut down more frequently.

BRIEF DESCRIPTION OF THE DRAWINGS

FIG. 1 is a top plan view of the transition area between the first and the second handling machine, the two classifying worms co-operating with one another, being in the operative position.

FIG. 2 is a side view of the right-hand portion of FIG. 1 taken according to the arrows II—II.

FIGS. 3 and 4 each are a top plan view of an embodiment wherein the co-operating classifying worms are in their operative position (FIG. 3) and in the released position (FIG. 4), respectively.

DESCRIPTION OF THE PREFERRED EMBODIMENTS

Figure 5:
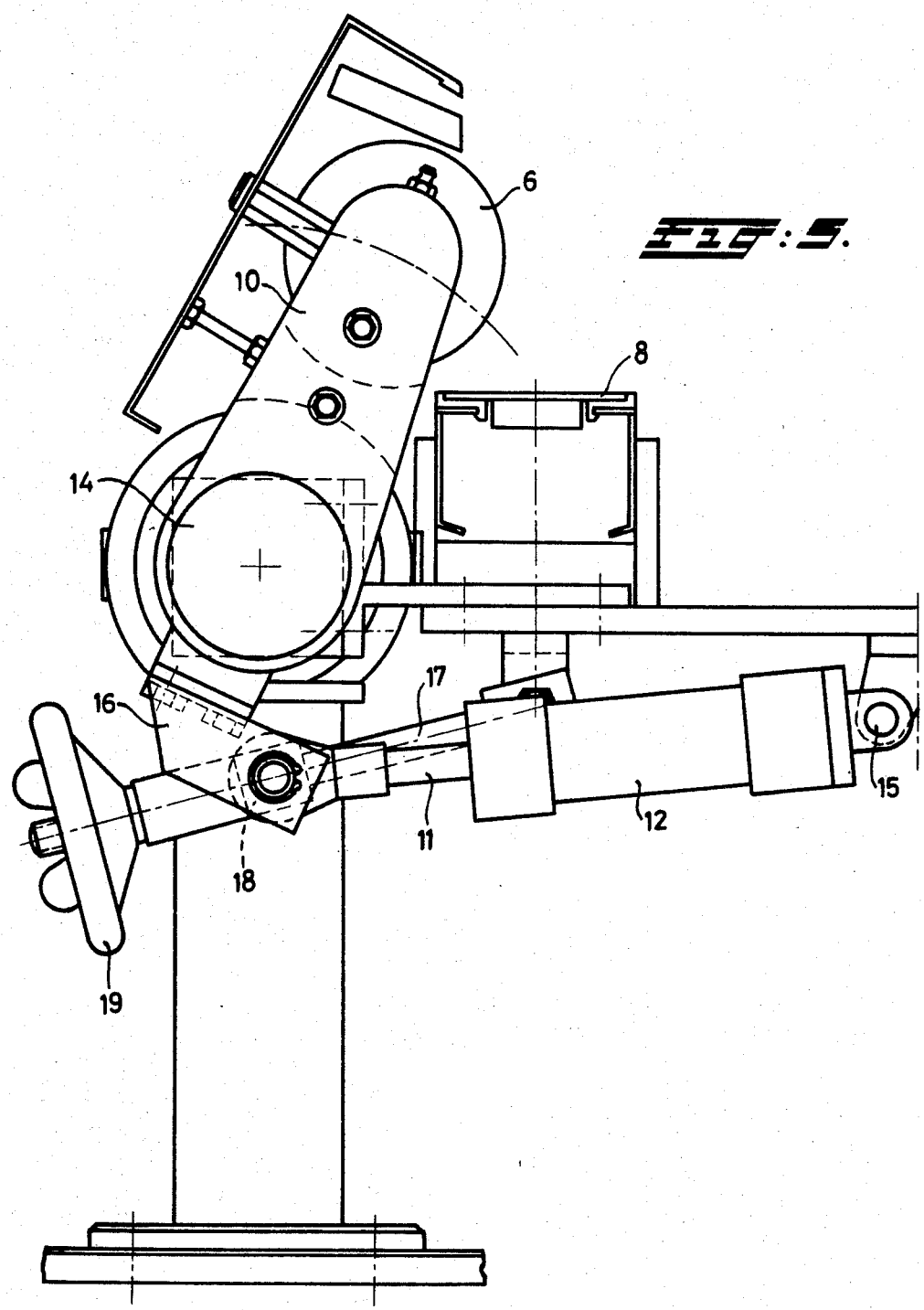
FIG. 5 is a view of the tiltable arrangement of the first classifying worm.

FIG. 1 shows schematically a first handling machine 1, at least the delivery star wheel 2 thereof. More particularly the first handling machine is designed in this case as a bottle-filling machine which, via a transition area 3, is connected to a second handling machine 4, at least to the inlet star wheel 5 thereof. The transition area 3 is formed by two parallel classifying worms 6 and 7 disposed at some distance from one another and partially overlapping one another. The first worm 6 adjoins the delivery star wheel 2, the second classifying worm 7 adjoining the inlet star wheel 5.

The transition area 3 further comprises a conveyor belt 8 positioned between the worms 6 and 7, said belt extending from an area located before the delivery star wheel 2 to a point beyond the inlet star wheel 5 (see also FIG. 2). Said conveyor belt 8 is supports and advances objects 9, in this case consisting of non-round bottles which, after having been filled in machine 1, have to be labeled in machine 4. Between the machines 1 and 4, there is provided a disengageable synchronous coupling (not shown) for driving the two machines and the classifying worms 6 and 7 thereof. The machine 4 is additionally provided, in the usual manner, with a so-called creep-speed drive for emptying and cleaning the installation.

So far, the device does not distinguish itself from the current state of the art. A problem frequently occurring in these types of installations, however, is how to handle an operational disturbance. When actually in one of the handling machines there occurs a disturbance, the installation is stopped, which may have disadvantageous consequences for certain parts of the installation and therefore in the operation of such machine. This shortcoming is especially relevant to the labeling machine 4 wherein, during stoppage, a drying and hardening of the applied glue occurs so that, before putting the installation into operation again, proper cleaning of the machine 4 has to be performed first.

In order to meet this problem, hitherto the following steps were taken: after stopping the installation, the objects (bottles) present in the grooves of the first classifying worm 6 were removed by hand, and the synchronous coupling was switched off, whereupon the second handling machine 4, i.e. the labeling machine, was put into the so-called creep-speed, in conjunction with its classifying worm 7. In this manner, all objects still present in the transition area 3 were handled in the machine 4 until the machine was entirely empty.

When after the elimination of the disturbance, the installation could be put back into operation, the synchronization between the two machines had to be realized first, whereupon the manually removed objects had to be replaced into the channels of the worm 6. All of these measures are rather cumbersome and at times even quite laborious because the area involved is difficult to access and dismantling operations must be performed first.

Actually, the device according to the present invention renders such manual intervention superfluous. To this end, the classifying worm 6 is contained in a yoke 10 which is guided so as to be transversely displaceable with respect to the conveyor 8 in the frame of the installation. Said yoke is connected to an adjusting piston 11 contained in a fixed pneumatic cylinder 12. When the installation has to be stopped for eliminating a disturbance occurring, the cylinder 12 is excited first, and the classifying worm 6 is retracted to a point beyond that of engagement with the objects 9 still present.

It should be noted in this connection that the conveyor belt 8 in the embodiment of FIGS. 1 and 2 is connected, via a chain transmission 13, to the inlet star wheel 5 of the machine 4. As a result, the speed V of the conveyor belt 8 is accurately adjusted to the translation speed of the objects 9 being generated by the worm 6. Due to this adjustment, the objects 9 remain in the formation indicated also when the classifying worm 6 is in the retracted position, and said objects can enter the first (helical) groove of the classifying worm 7 with the pitch distance as prescribed, during the aformentioned creep-speed mode of the machine 4.

It is further to be noted that the width of the first groove of the classifying worm 7 is greater than the actual size of the objects 9. This ensures that, also in the event of small deviations in the proper formation and mutual distances of the objects 9 on the conveyor belt 8, a jamming or clamping with concomitant breaking of the objects (bottles) is effectively prevented.

With respect to the installation described hereinbefore (FIGS. 1 and 2), in the embodiment of FIGS. 3 and 4 the conveyor belt 8 has its own drive so that no intercoupling with the delivery star wheel 5 is required. In this case, the speed of the conveyor belt 8 will be tuned to the speed of travel of the objects 9 in the star wheels 2 and 5 during normal operation. Said belt speed will therefore exceed the traveling speed of the objects 9 in the transition area 3 during the creep-speed (FIG. 4) of the machine 4. The classifying worms 6 and 7 do not have a constant pitch, since the worm 6 terminates with a pitch reduced so that the objects 9 entirely or almost adjoin one another. The classifying worm 7 starts with a pitch reduced to the same extent whereupon said pitch increases to the value desired in connection with the construction of the inlet star wheel 5.

The conveyor belt 8 can then be kept running so that, after swinging away the classifying worm 6, the objects 9 are urged against each other, which is clearly apparent from FIG. 4. This figure furthermore shows that there is also provided a guide rail 20 along the conveyor belt 8 in order to prevent the objects 9 from being pushed from the conveyor belt. This rail is also provided in the embodiment illustrated in FIGS. 1 and 2.

The specific embodiment according to the FIGS. 3 and 4 of the classifying worms 6 and 7 provides a compensation for the absence of the special chain transmission 13 illustrated in FIGS. 1 and 2 which tunes the speed V of the conveyor belt accurately to the speed in the creep mode of the inlet star wheel 5.

FIG. 5 illustrates a modified embodiment of the operating device 11, 12 shown in FIGS. 1-4, and more specifically because the yoke 10 of the classifying worm 6 is not reciprocated linearly, but can be tilted about a shaft 14. As a result, the displacement of the classifying worm 6 consists in an upwardly directed, arcuate tilting movement. In this case, the cylinder 12 is pivotally connected, at 15, to the frame of the machine and the adjusting piston 11 is connected to an arm 16 of the yoke 10. The path of displacement of the classifying worm 6 can be accurately adjusted by means of a screwthreaded rod 17 upon which there is provided a tubular nut 18. This nut comprises a hand wheel 19 and is furthermore connected to the arm 16 of the yoke 10.

In an installation that has been stopped (for example, due to a disturbance), the device of the present invention renders it possible to empty the second handling machine 4 (the labeling machine) and to subsequently prevent the occurrence of a jamming of either or both of the classifying worms when putting the installation into operation again.

To resume operation, the classifying worm 6 is first brought from its inoperative to its operative position. Thereupon, the installation is synchronized in the creep-speed mode. The speed of the installation is gradually increased until it reaches the operating speed desired. Consequently, the usual manual intervention in the flow of objects 9, and occurring in known machines of this type, can be dispensed with.

The embodiment of this invention particularly disclosed and described hereinabove is presented merely as an example of the invention. Other embodiments, forms, and modifications of the invention coming within the proper scope and spirit of the appended claims will, of course, readily suggest themselves to those skilled in the art.

What is claimed is:

1. A device for connecting the outlet of a first handling machine, having a delivery star wheel, and in which a series of objects are adapted to be delivered to an inlet star wheel of a second handling machine, said device comprising first and second parallel classifying worms disposed at some distance from one another and partially overlapping one another, one of said worms adjoining said outlet of the first machine and the other of said worms adjoining said inlet of the second machine, and a conveyor belt provided between said classifying worms for supporting and advancing said series of objects, a disengageable synchronous coupling disposed between said machines and said classifying worms, said second machine with the inlet coupled thereto having a separate creep-speed drive, means for positively displacing said first classifying worm transversely to its longitudinal direction so that said first classifying worm is positively displaced to an inoperative position away from contact with said objects so as to permit the accumulation of said series of objects should a disturbance, such as an interruption, occur at said second handling machine, and in the area of said first classifying worm, a guide rail is disposed along said conveyor belt for guiding said series of objects and preventing said series of objects from being pushed off said conveyor belt.

2. The device of claim 1, wherein said first classifying worm having over its entire length a pitch corresponding to the pitch of said delivery star wheel of said first handling machine, and the drive to said conveyor belt being such that the belt speed substantially corresponds to the speed at which said first classifying worm displaces said objects.

3. The device of claim 1, wherein both of said classifying worms having in the area of overlap a pitch corresponding to the width of the objects, and the drive of the conveyor belt proceeding independently of one of the handling machines.

4. The device of claim 1, wherein the first classifying worm has at least two groove windings in the portion ahead of the overlapping area with the second classifying worm.

5. The device of claim 2, wherein the positive displacement means of the first classifying worm provides an arcuate tilting movement.

* * * * *